(12) United States Patent
Moe (10) Patent No.: US 8,504,549 B2
(45) Date of Patent: *Aug. 6, 2013

(54) METHOD FOR IMPROVING SEARCH EFFICIENCY IN ENTERPRISE SEARCH SYSTEM

(75) Inventor: Petter Moe, Billingstad (NO)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/187,206

(22) Filed: Jul. 20, 2011

(65) Prior Publication Data

US 2011/0276559 A1 Nov. 10, 2011

Related U.S. Application Data

(63) Continuation of application No. 11/987,642, filed on Dec. 3, 2007, now Pat. No. 7,991,777.

(51) Int. Cl.
*G06F 7/00* (2006.01)

(52) U.S. Cl.
USPC .......................................... 707/706; 707/740

(58) Field of Classification Search
USPC .................................. 707/706, 740
See application file for complete search history.

(56) References Cited

U.S. PATENT DOCUMENTS

| 6,263,334 | B1 | 7/2001 | Fayyad et al. | 707/737 |
|---|---|---|---|---|
| 6,490,579 | B1 | 12/2002 | Gao et al. | 707/707 |
| 6,877,002 | B2 | 4/2005 | Prince | 707/749 |
| 7,092,936 | B1 | 8/2006 | Alonso | 707/737 |
| 7,647,293 | B2 | 1/2010 | Brown | 709/999.002 |
| 7,711,703 | B2 | 5/2010 | Smolen et al. | 707/609 |
| 7,725,470 | B2 | 5/2010 | Richards | 707/737 |
| 7,734,616 | B2 | 6/2010 | Mogi et al. | 707/713 |
| 7,877,405 | B2 | 1/2011 | Kothuri et al. | 707/769 |
| 2005/0097072 | A1 | 5/2005 | Brown et al. | 707/1 |
| 2005/0267871 | A1 | 12/2005 | Marchisio et al. | 707/3 |
| 2006/0179035 | A1 | 8/2006 | Broker | 707/3 |
| 2008/0034058 | A1 | 2/2008 | Korman | 709/217 |

FOREIGN PATENT DOCUMENTS

| CA | 2 545 366 | 1/2007 |
|---|---|---|
| EP | 1 367 509 | 12/2003 |
| EP | 1 494 144 | 1/2005 |
| WO | WO2009/070030 | 6/2009 |

OTHER PUBLICATIONS

Pluempitiwiriyawej, et al.; "*Element matching across data-oriented XML sources using a multi-strategy clustering model*" Elsevier, Data & Knowledge Engineering 48 (2004) 297-333.

Lima, et al.; "*Adaptive Virtual Partitioning for OLAP Query Processing in a Database Cluster*"; In Proc 19th SBBD (2004) 92-105.

(Continued)

*Primary Examiner* — Belix M Ortiz Ditren
(74) *Attorney, Agent, or Firm* — Merchant & Gould (57) ABSTRACT

A search system with a search engine applies a user search query to an index of the documents stored in a document repository for returning a result set of matching documents to a user. In order to more efficiently access, search and retrieve documents stored in document repositories, one of a document repository and an index thereof or both are partitioned in one or more dimensions, and a partition is configured in a specific dimension according to two or more document attribute values selected from one and the same attribute category. This shall enable a search application to access significantly less data in order to determine a search result and shall specifically improve the efficiency of enterprise search systems in a high degree.

20 Claims, 7 Drawing Sheets

OTHER PUBLICATIONS

Chang, et al.; "*The Onion Technique: Indexing for Linear Optimization Queries*"; ACM MOD 2000 (2000) 391-402.
Graefe, G.; "*Query Evaluation Techniques for Large Databases*"; ACM Computing Surveys 25(2) (1993) 73-170.
International Search Report dated Jan. 28, 2009, in WO2009/070030.
Tseng, et al.; "*The Concept of Document Warehousing for Multi-Dimensional Modeling of Textual-Based Business Intelligence*"; Decision Support Systems, Elsevier Science Publishers, Amsterdam, NL; vol. 42, No. 2, Nov. 1, 2006, pp. 727-744.
Written Opinion dated Jan. 28, 2009, in PCT/NO2008/000404.

METHOD FOR IMPROVING SEARCH EFFICIENCY IN ENTERPRISE SEARCH SYSTEM

RELATED APPLICATIONS

This application is a continuation of and claims priority to application Ser. No. 11/987,642, filed Dec. 3, 2007, entitled A METHOD FOR IMPROVING SEARCH EFFICIENCY IN ENTERPRISE SEARCH SYSTEM, which is hereby incorporated in its entirety by reference.

TECHNICAL FIELD OF THE INVENTION

The present invention concerns a method in information access, search, and retrieval of documents stored in document repositories, wherein the access, search and retrieval are performed by means of application in the form of a search system, with a search engine implemented on one or more servers connected in a data communication network, wherein the application comprises crawling and indexing the stored document and storing a thus created index, applying a user's search query to the index or the documents, retrieving and analyzing documents matching the search query, and returning a result set of at least some of the matching documents to the user.

BACKGROUND OF THE INVENTION

The present invention specifically relates to search applications in enterprise search systems. An enterprise search system is generally built upon search applications implemented by a search engine, as well-known to persons skilled in the art. The search engine itself are located on one or more servers connected and operated in a data communication network which in enterprise search systems usually can be regarded as any local network or an intranet. The search engine comprises appropriate interfaces to clients or users of the enterprise search system as well as to content or document repositories belonging to an enterprise, but possibly also to document repositories located outside the enterprise and belonging to external information providers, but accessible from the local data communication network. The search engine comprises a subsystem for indexing documents and content in repositories belonging to the enterprise or residing in external repositories. Indexes created by the indexing subsystem of the search engine are usually stored on the servers used by the enterprise search system. Further subsystems of the search engine handle user search queries, retrieve and analyze documents matching a search query, and present result sets of the matching documents to the user.

Current search systems tend to fall into one of two categories with regard to index types:

Live or active index, wherein all information can be accessed very quickly, but where there is typically a significant overhead in keeping the search system ready to respond Disk-based index, wherein information to be indexed is written sequentially to one or usually several files. These systems are characterized by much lower idling overhead, but also much higher latency and overhead when starting a search operation. Disk-based indexes are often denoted dormant or non-active, as opposed to live indexes, which can be accessed much faster.

However, both types have certain shortcomings with regard to search efficiency. In live indexes, as described above, the number of documents that can be stored on one server is usually limited by the memory available on the server. Further, the access structure of the index itself is usually based on inverted files of the content, such that only a limited number of disk or memory accesses are needed to identify records that should belong to a search result. This principle tends to break down when indexing very large corpora, since individual search terms are likely to appear across a large number of documents.

SUMMARY OF THE INVENTION

In view of the above-mentioned shortcomings it is an object of the present invention to limit memory usage and access overhead when performing a search.

Another object of the present invention is to significantly increase the number of documents that can be stored on an active or live search node.

The above objects as well as further features and advantages shall be realized with a method according to the invention which is characterized by partitioning one of a document-repository or an index thereof or both in one or more dimensions, and configuring a partition in a specific dimension according to two or more document attribute values selected from one and the same attribute category.

Additional features and advantages shall be apparent from the rest of the disclosure material.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

SUMMARY OF DRAWINGS

The present invention shall be better understood when the following detailed description of certain embodiments of the present invention is read in conjunction with the appended drawings, of which FIG. 1 shows a block diagram of a simplified search engine architecture as used with the method of the present invention, FIG. 2 an example of how a set of mail documents partitioned in two dimensions matches a given text search, FIG. 3 the example of FIG. 2 limited to a single partition, FIG. 4 a two-dimensional partition reduced to a one-dimensional temporal partition with calendar year as the selected attribute value, FIG. 5 an example of a searched partition in FIG. 4 yielding a search result set including results as would be returned in the example of FIG. 3, FIG. 6 an example of a two-dimensional partition based on time (calendar year) and name, for instance a sender name, as attribute values, and FIG. 7 an example of a partition of FIG. 6 searched to yield the result set in FIG. 3.

The drawings will be described in detail in the course of the detailed description of the invention.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
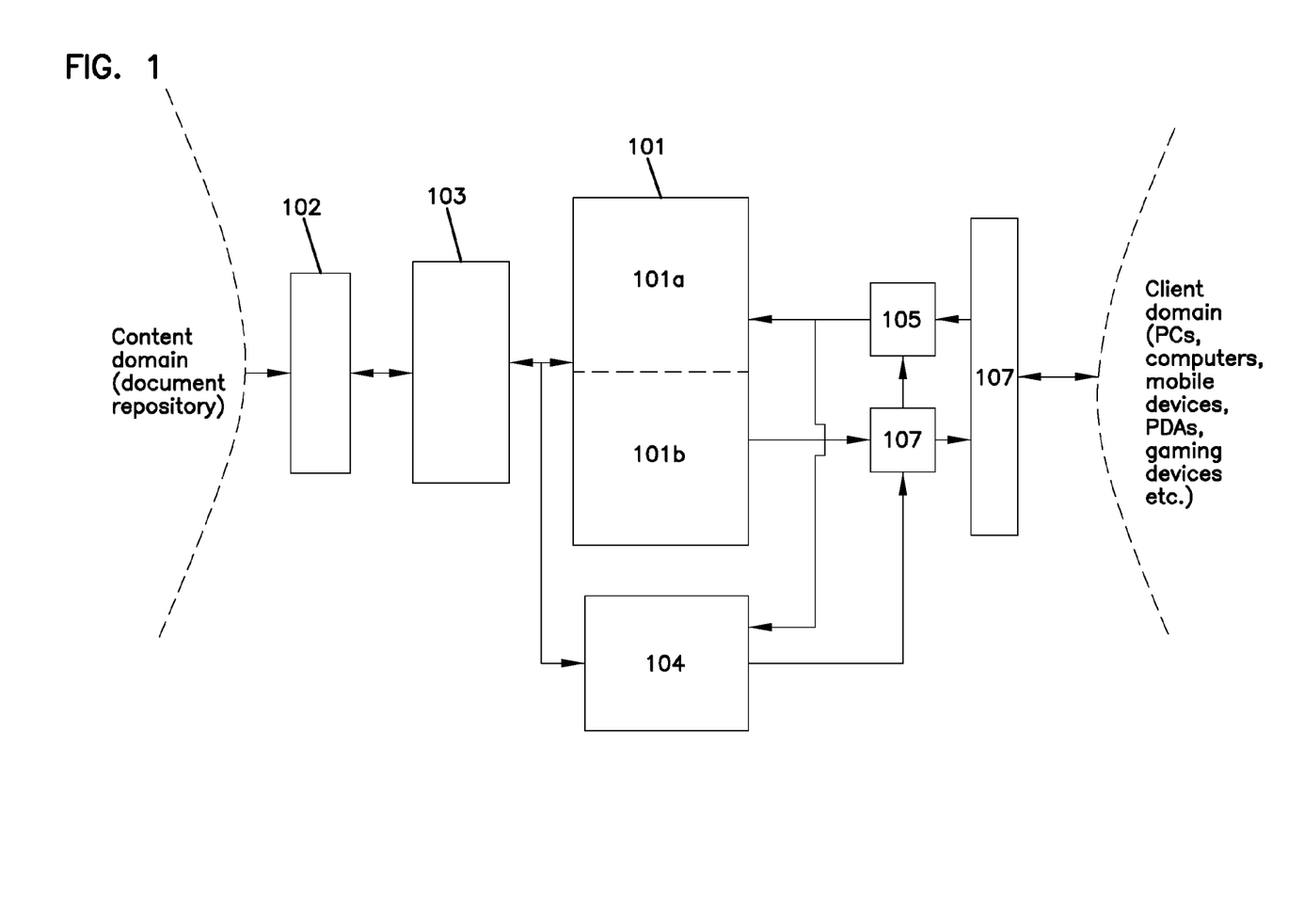

In the following a search engine as used with the method of the present invention shall be discussed in some detail with reference to the block diagram of a general search engine architecture as shown in FIG. 1.

The search engine 100 as used with the method according to the present invention shall as known in the art comprise various subsystems 101-107. The search engine can access document or content repositories located in a content domain or space wherefrom content can either actively be pushed into the search engine, or via a data connector be pulled into the search engine. Typical repositories include databases, sources made available via ETL (Extract-Transform-Load) tools such as Informatica™, any XML formatted repository, files from file servers, files from web servers, document management systems, content management systems, email systems, communication systems, collaboration systems, and rich media such as audio, images and video. The retrieved documents are submitted to the search engine 100 via a content API (Application Programming Interface) 102. Subsequently, documents are analyzed in a content analysis stage 103, also termed a content pre-processing subsystem, in order to prepare the content for improved search and discovery operations. Typically, the output of this stage is an XML representation of the input document. The output of the content analysis is used to feed the core search engine 101. The core search engine 101 can typically be deployed across a farm of servers in a distributed manner in order to allow for large sets of documents and high query loads to be processed. The core search engine 101 can accept user requests and produce lists of matching documents. The document ordering is usually determined according to a relevance model that measures the likely importance of a given document relative to the query. In addition, the core search engine 101 can produce additional metadata about the result set such as summary information for document attributes. The core search engine 101 in itself comprises further subsystems, namely an indexing subsystem 101a for crawling and indexing content documents and a search subsystem 101b for carrying out search and retrieval proper. Alternatively, the output of the content analysis stage 103 can be fed into an optional alert engine 104. The alert engine 104 will have stored a set of queries and can determine which queries that would have accepted the given document input. A search engine can be accessed from many different clients or applications which typically can be mobile and computer-based client applications. Other clients include PDAs and game devices. These clients, located in a client space or domain will submit requests to a 'search engine query or client API 107. The search engine 100 will typically possess a further subsystem in the form of a query analysis stage 105 to analyze and refine the query in order to construct a derived query that can extract more meaningful information. Finally, the output from the core search engine 101 is typically further analyzed in another subsystem, namely a result analysis stage 106 in order to produce information or visualizations that are used by the clients. Both stages 105 and 106 are connected between the core search engine 101 and the client API 107, and in case the alert engine 104 is present, it is connected in parallel to the core search engine 101 and between the content analysis stage 103 and the query and result analysis stages 105; 106.

The servers hosting the search engine are usually implemented as computers, and both index and documents may be stored across the computer memories. However, the kind and manner of storage shall greatly affect the handling of search queries, as well as access and retrieval speeds. Evidently, disk-based index storage shall have much higher latency than indexes stored in high-speed and random access memory.

Now a discussion of specific embodiments of the present invention shall be given with two-dimensional partitioning and the resulting partition structure as the prime example.

Initially it should be noted that an attribute category can be defined as comprising terms and concepts belonging to one and the same class of terms and concepts. Also note that the following description and examples assume uniquely determinable attribute values. In cases where several attribute values within one attribute category are applicable, the method of the invention can be refined by replicating index entries. Particularly the attribute categories can be limited by only comprising terms and concepts belonging to document metadata, i.e., they shall not as such derive from the content uniquely related to the document or belonging to the unique information conveyed by a document. Instead metadata will for instance be dates, places, persons etc., linked with the document, but in a meta-relation thereto, for instance such as a place of origin or a specific sender of the documents, and it is obvious that a plurality of documents will share at least one and usually many of the same metadata. A partitioning in specific dimension is performed by using attribute values selected from one and the same attribute category. In other words, the attribute values used for partitioning will be terms and concepts within a specific attribute category. Typically such attribute categories can be temporal, i.e., comprising terms and concepts relating to time, or they may relate to legal and moral rights, for instance by disclosing access permissions, data and information ownership or various intellectual property rights which could include copyright, patents, trademarks or designs etc. A further useful attribute category would be one comprising terms and concepts relating to physical objects and classes thereof, and one may easily think of for instance terms and concepts deriving from a product guide and the like. A useful attribute category could also relate to persons, groups of persons, or organizations, and again limited to terms and concepts deriving from metadata only. Finally, an attribute category could be made up of terms and concepts defining a navigation tool or a classification scheme, but a person skilled in the art shall easily realize that a category of this kind can be considered as two- or even multi-dimensional in itself on the basis of for instance adopting a two-dimensional classification scheme. Partitioning can of course be performed by using two, or even more attribute categories resulting in a multi-dimensional partition. This would also be the case when combining an attribute category comprising for instance a two-dimensional classification scheme as last mentioned with any of the afore-mentioned attribute categories for partitioning.

In the examples given below the two dimensions consequently are restricted to metadata attributes that for instance are falling in a temporal category and a name category. The temporal category is represented as calendar years while the name category can for instance be thought of as the name of senders of mail documents. For convenience and ease of terminology a searchable partition shall in the following be denoted as a silo, and as will be understood, in a one-dimensional partitioning of a content repository or an index, the partitions can be regarded as a one-dimensional array of searchable silos, while in a two-dimensional partitioning the partitions can be represented as a two-dimensional array of searchable silos. Of course, by a suitable selection of attribute categories partitioning can be performed in three and more dimensions, and it is easily seen that the silos in a three-dimensional partitioning can be represented as a cubic array.

Partitioning can be applied to a document repository as well as an index. Partitioning for instance the document repository in two or more dimensions and then using the search engine indexing subsystem 101a to index all silos separately shall yield an index partitioned two-dimensionally in corresponding silos. In case only the document repository shall be partitioned, all the silos are indexed in a common index, but with the index terms being provided joined to partition-specifying attributes selected such that the search is limited to the silo yielding the desired matching result set to an input search query. Finally, if partitioning is limited to the index, only the document having matching attributes will be retrieved and analyzed to yield a result set matching an input search query.

The advantage of the present invention will be particularly evident when a search query is based on using attribute values only as search terms. In principle an index partition could be limited to metadata values only and thus the search could be performed wholly without resorting to the terms indexed from the unique information content of the document. In case both the document repository and the index are partitioned, an index partition will have unique relationship to a corresponding document partition, and be based on the same attribute values. The attribute values used in an index partition hence would serve to access the document repository partition comprising documents matching the search query. However, it should be noted that present-day search applications enable various refinements of the search queries as well as in regard of the returned result set. These refinements of course would easily be applicable within the scope of the method according to the present invention.

As stated and discussed hereinabove, the present invention shall preferably be limited to metadata attributes, i.e., attributes that is not a member of the message content of the document as such, but rather belong to metadata classes or categories defining the circumstances of a document's origin, its membership in specific document classes or other metadata relating to the communication of the documents, for instance such classes as sender's name, receiver's name and of course time, which could be given in any calendar unit desired, but usually restricted to one and the same calendar unit for specifying a partitioning in the temporal dimension. It could for instance be the year of origin, the date when the transmission took place, or the year when the document was created etc.

Figure 2:
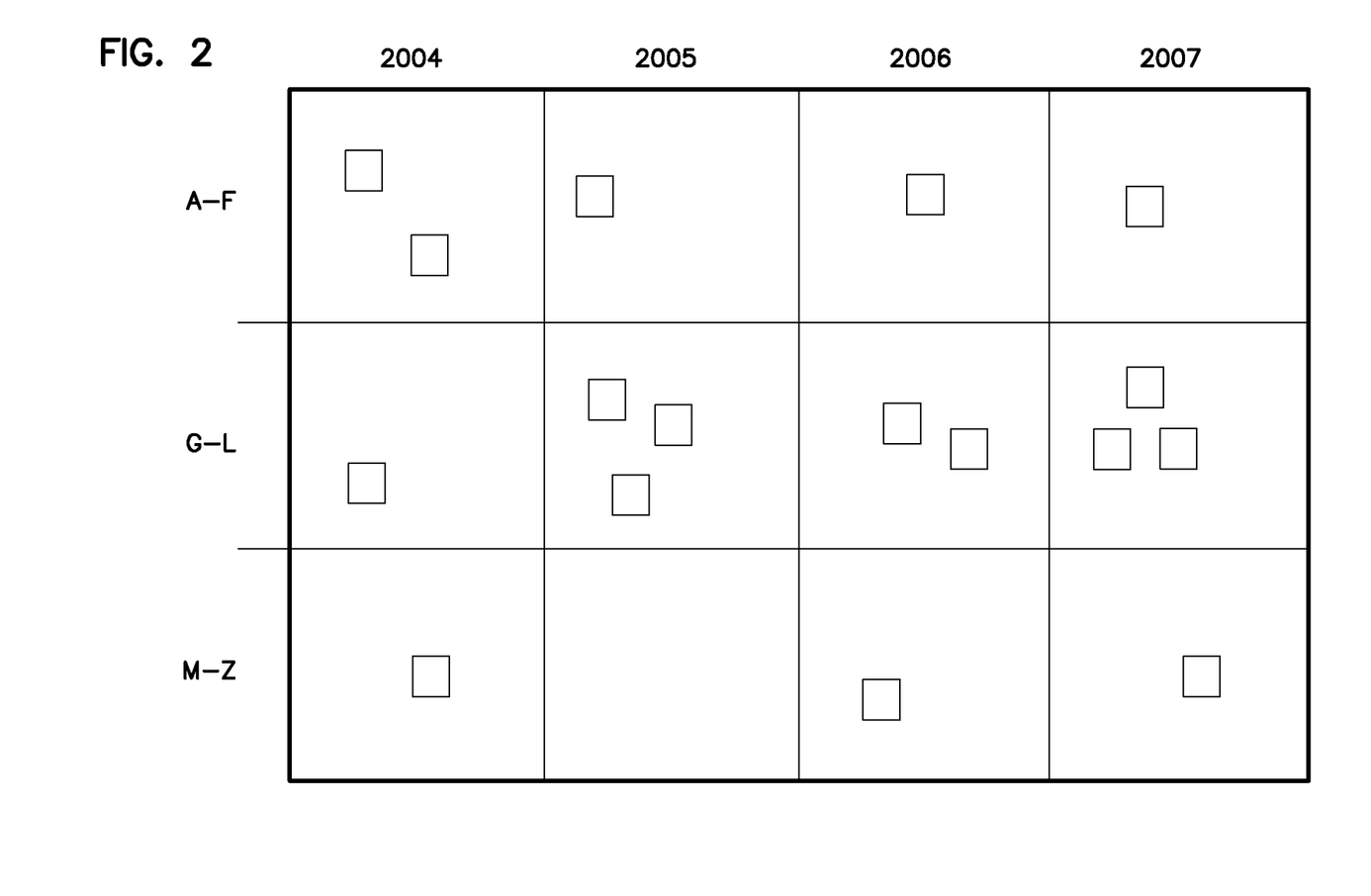

Specifically FIG. 2 shows how a set of mail documents could be partitioned in two dimensions. By partitioning in a first dimension, i.e., along the horizontal axis, an attribute category relating to temporal terms and concepts is used. In the present case the concept is year and the selected attribute values are calendar years. In the second dimension, i.e., along the vertical axis, terms from the attribute category relating to persons, groups and organizations are used and partitioning is performed with attribute values which for instance are persons' names grouped into subsets based on an alphabetization. Overall the document partitions as shown in FIG. 2 could for instance be regarded as a set of mail documents sorting according to the calendar year in which they were created or sent and with partitioning in the second dimension formed on the basis of for instance a sender's surnames. As a result a total of 9 partitions or silos are generated and could be indexed separately to generate corresponding index partitions.

Figure 3:
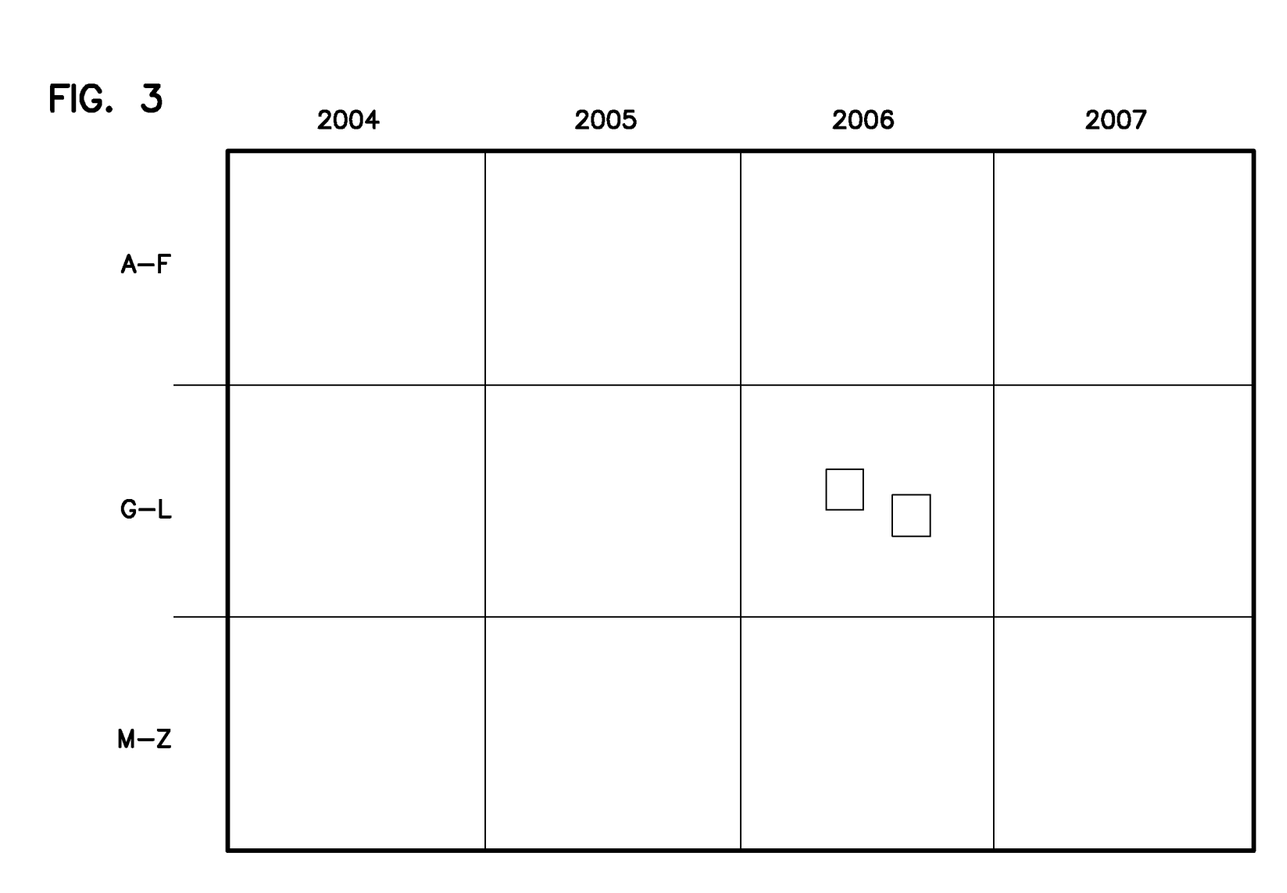
Figure 4:
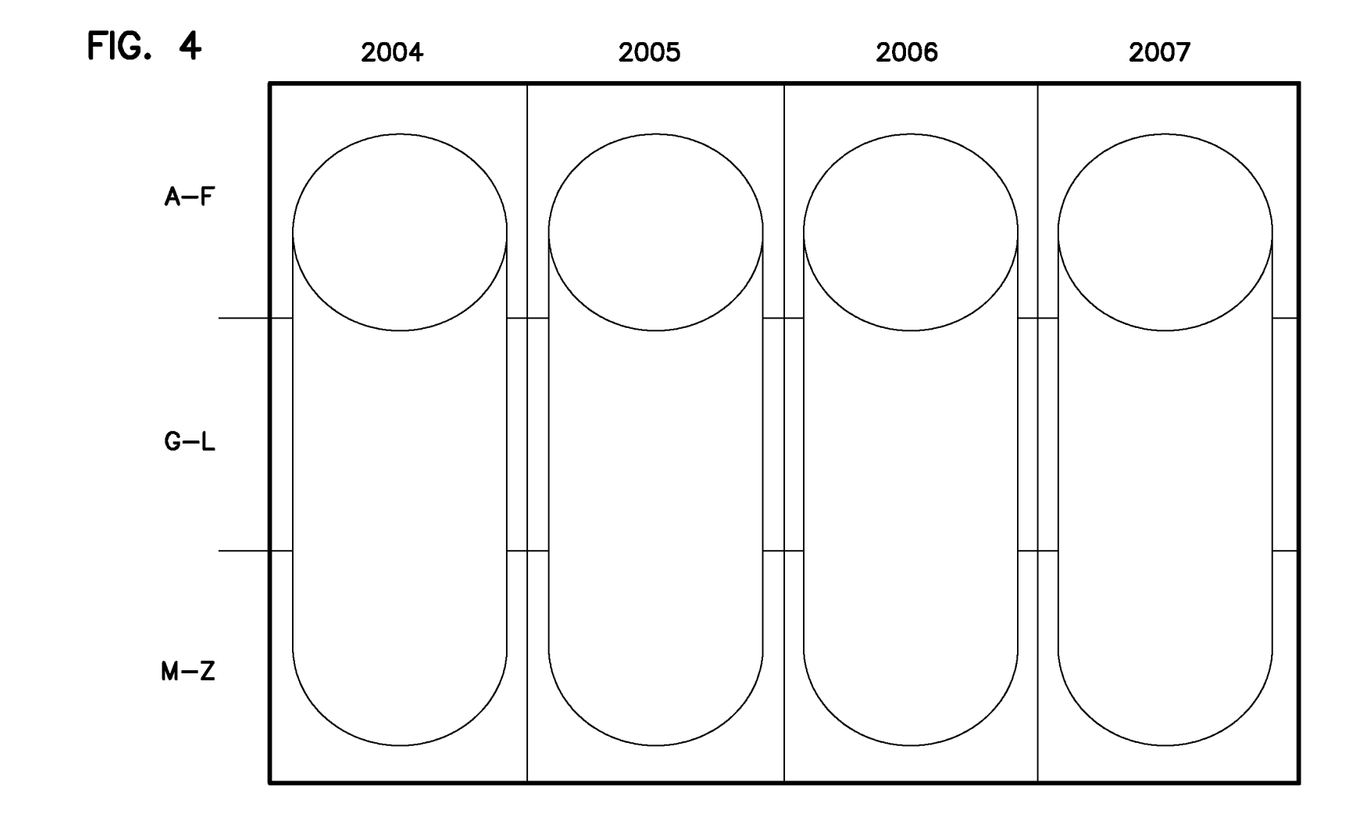
Figure 5:
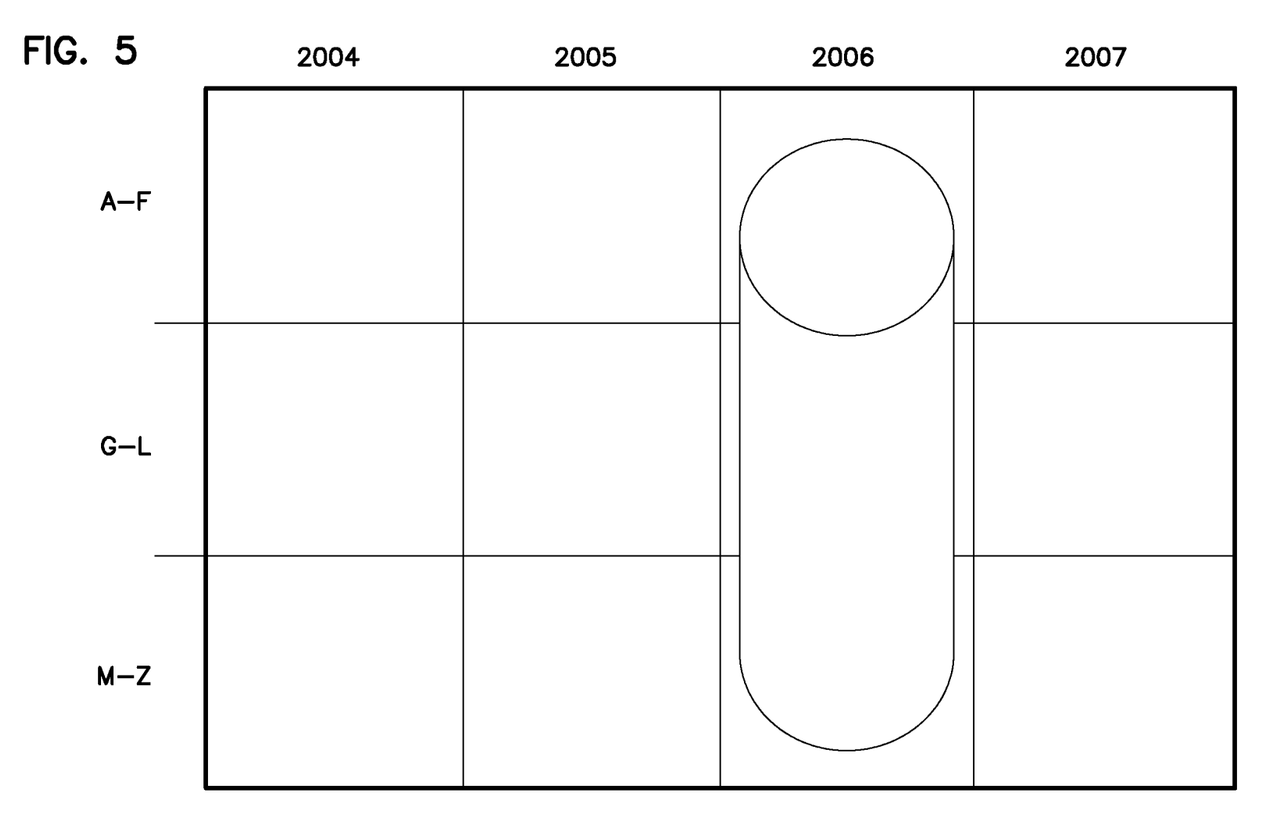

Now by employing a search query where the search is appropriately delimited by combining for instance freely chosen index terms with the attribute value 2006 and names with values ranging from first surname letter G to and including first surname letter L, the returned result set will be limited to the documents as shown in the silo 2006; G-L. If the attribute value was limited to a specific person's name a similar result set would of course be obtained. Worth noticing is that the same result set will be generated even if the search terms were limited to attribute values only, and with a substantial increase in access speed and a correspondingly quick response. By essentially selecting a one-dimensional partitioning as shown in FIG. 4, which is limited to the attribute category relating to temporal terms and concepts, using calendar year as attribute values, a partition in the form of the so-called silo is created for each of the calendar years. Each of the silos would pertain to for instance senders or originators of emails and electronic documents, with the year of sending or creating as the partition attribute value. Also this would result in a significant increase of the access speed and a corresponding reduction of the response time. It is now also seen as shown in FIG. 5 that by searching the silo generated by the partition "2006", a result set including the result set of FIG. 3 shall be returned.

Figure 6:
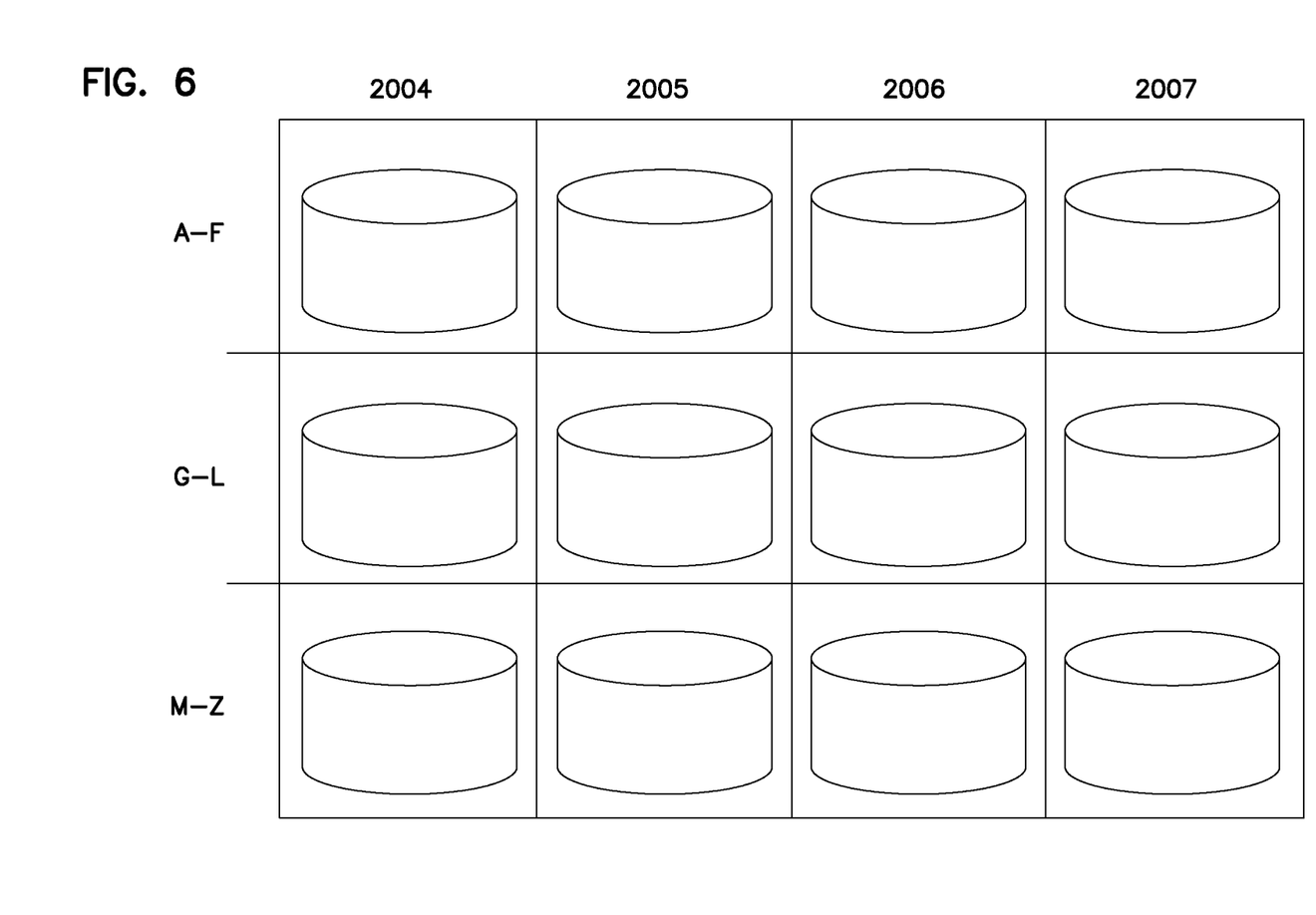
Figure 7:
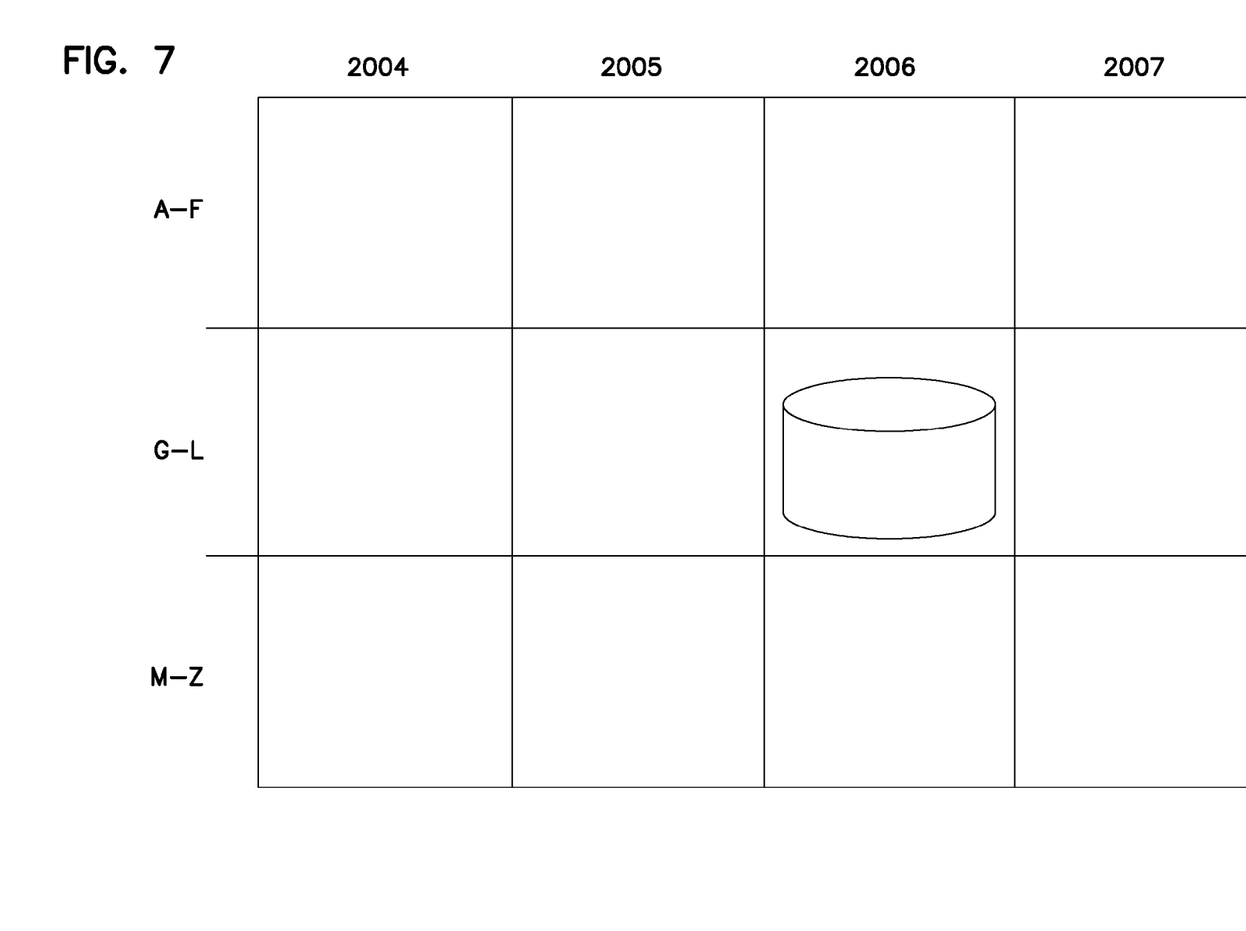

FIG. 6 shows the silos resulting from using a two-dimensional partitioning with regard both to the attribute category related to temporal terms and concepts as well as the attribute category related to persons and etc., and with'attribute values restricted to personal names. This partitioning scheme will accordingly yield 12 separate silos, but as shown in FIG. 7 only the silo 2006; G-L would have to be searched in order to yield the result set shown in FIG. 3. The appropriate restriction would here be achieved by using attribute values in the form of metadata, viz. 2006 and for instance a particular sender's name such as Hansen. Searching can be done quickly and efficiently by avoiding the need to use full text indexing terms that would appear across a huge number of the documents of a repository and instead limiting the search to metadata terms linked to a document such as a date, calendar year, point of origin or sender's name and thus restrict the search to only one specific silo.

A particularly intriguing consequence of the method according to the present invention is the possibility of performing a tuning or load-balancing of the search system. Such a tuning and load-balancing of the search system can be explained as follows. By analyzing the search pattern over a period a time, it will often be clear that given attribute values are correlated. This knowledge can be used to co-locate documents whose attribute values are frequently searched together, into the same index partition. This will directly limit the number of silos that need to be accessed, hence limiting the cost of a search.

If search logs are not available for performing the above analysis, the distribution of values in the document set can be used instead. Co-locating documents whose attribute values are likely to be searched together will increase the performance. This would trivially be the case for attribute values of the temporal domain, probably also for the organizational domain, but not for domains where adjacent values are not related, i.e., the enumeration order does not imply logical closeness.

In order to further improve the efficiency of the search system, it is preferred that only a subset of the index partitions is selected as live and active index partitions. As noted above, a live index allows information access to take place very quickly. In other words, the response time of the search system is reduced, although of course, there shall be a trade-off with regard to system resource overhead, as an active index partition is stored on the internal or high-speed memory of one or more servers hosting the search engine. Implicitly this also means that the remaining non-active partitions are kept as dormant partitions and located on the disk storage available to the search engine. Advantageously the active index partitions constituting the subset can be selected on basis of past access patterns to the index partitions. A subsystem of the search engine for instance records the accesses to the created partitions and selects the subset of active partitions on basis of the access frequency to these partitions. It can also be advantageous to base the selection of active index partitions on a number of those partitions most recently used, for an optimum selection of active index partitions as this obviously can be taken to reflect current user search activities. The selection can also be based on a combination of access frequency and the recent use.

Finally, it could also be advantageous selecting the subset of active index partitions on basis of an expected access pattern. Then an expected access pattern must be estimated on the basis of an observed set of events, which can be shown to influence a future or imminent access pattern. Such events would be external to the search engine, and the most typical instance would be instances of given users or a member of a given user group logging on to the search system taking into account the historical record of the user or user group search activity.

Based on observed or estimated search and access patterns it is obvious that optimum selection of partitioning criteria will yield partitions that are accessed much more frequently, while others shall be accessed rather infrequently or maybe not at all for a long period. Hence it is nearly trivial that judicious selection of a subset of index partitions as active shall heavily influence the efficiency of the search system.

The present invention describes a way of limiting the search based on not only the presence of indexed words in documents, but other parameters. This enables the search application to access significantly less data before determining the result, and hence, as will be seen, considerably improves the efficiency of enterprise search systems.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method executing on a processor for accessing and searching information, comprising:
    selecting a first subset of silos as active and a second subset of the silos as non-active based on an access pattern to the silos, each of the silos containing an index of stored documents that are associated with a different document attribute value in an attribute category;
    receiving a query for a search engine that is associated with a particular document attribute value;
        applying the query to a given index in the silo to which the particular document attribute value pertains; and
        returning a result set comprising stored documents that are retrieved by applying the query.

2. The method of claim 1, wherein the active silos are stored in memory and the non-active silos are stored on a disk based device.

3. The method of claim 1, wherein the access pattern is past access patterns to the silos.

4. The method of claim 1, wherein the access pattern is expected future access patterns.

5. The method of claim 1, further comprising partitioning documents into the silos based on a document attribute value.

6. The method of claim 1, further comprising determining the document attribute values pertaining to the silos based on an observed distribution pattern.

7. The method of claim 1, further comprising partitioning the silos into at least two dimensions.

8. The method of claim 1, further comprising analyzing a search pattern over a period of time to determine correlated attribute values.

9. The method of claim 8, further comprising co-locating documents based on the correlated attribute values.

10. A system for accessing and searching information, comprising:
    a processor and a memory;
    silos that each contain an index of stored documents that are associated with a different document attribute value in an attribute category;
    the processor configured to perform actions, comprising:
        selecting a first subset of the silos as active and selecting a second subset of the silos as non-active that are stored on disk storage based on access patterns to the silos;
        receiving a query for a search engine that is associated with a particular document attribute value;
        applying the query to the silo to which the particular document attribute value pertains; and
        returning a result set that are retrieved by applying the query.

11. The system of claim 10, wherein the active silos are stored in a high-speed memory.

12. The system of claim 10, wherein the access patterns are one of past access patterns to the silos and expected future access patterns to the silos.

13. The system of claim 10, further comprising partitioning documents into the silos based on a document attribute value.

14. The system of claim 10, further comprising observing a distribution pattern of attribute values employed in searches.

15. The system of claim 10, further comprising partitioning the silos into at least two dimensions.

16. The system of claim 10, further comprising limiting the search to metadata terms that are associated with the documents.

17. A computer-readable medium, excluding a signal, storing instructions that when executed perform steps, comprising:
    selecting a first subset of silos as active that are stored in a high-speed memory and a second subset of the silos as non-active that are stored on a disk based storage based on an access pattern to the silos, each of the silos containing information relating to stored documents that are associated with a different document attribute value in an attribute category;
    receiving a query for a search engine that is associated with a particular document attribute value;
    applying the query to a given index in the silo to which the particular document attribute value pertains; and
    returning a result set comprising stored documents that are retrieved by applying the query.

18. The computer-readable medium of claim 17, wherein the access pattern is past access patterns to the silos and expected future access patterns.

19. The computer-readable medium of claim 17, further comprising partitioning documents into the silos based on a document attribute value.

20. The computer-readable medium of claim 19, further comprising using an observed distribution pattern of search terms to assist in partitioning the documents.

* * * * *